(12) United States Patent
Marcato

(10) Patent No.: US 10,094,407 B2
(45) Date of Patent: Oct. 9, 2018

(54) MODULAR FRAME FOR MAKING SEATS AND FURNISHING ELEMENTS IN GENERAL PROVIDED WITH A SUPPORTING SURFACE

(71) Applicant: LAPALMA SRL, Cadoneghe (IT)

(72) Inventor: Romano Marcato, Cadoneghe (IT)

( * ) Notice: Subject to any disclaimer, the term of this patent is extended or adjusted under 35 U.S.C. 154(b) by 0 days.

(21) Appl. No.: 15/309,407

(22) PCT Filed: May 12, 2015

(86) PCT No.: PCT/IB2015/053477
§ 371 (c)(1),
(2) Date: Nov. 7, 2016

(87) PCT Pub. No.: WO2015/173725
PCT Pub. Date: Nov. 19, 2015

(65) Prior Publication Data
US 2017/0175788 A1    Jun. 22, 2017

(30) Foreign Application Priority Data

May 13, 2014  (IT) .............................. PD2014A0123

(51) Int. Cl.
| | |
|---|---|
| *A47C 7/00* | (2006.01) |
| *F16B 12/42* | (2006.01) |
| *A47B 13/06* | (2006.01) |
| *A47C 4/02* | (2006.01) |
| *F16B 12/50* | (2006.01) |
| *F16B 12/52* | (2006.01) |

(Continued)

(52) U.S. Cl.
CPC .............. *F16B 12/42* (2013.01); *A47B 13/06* (2013.01); *A47C 4/02* (2013.01); *F16B 12/46* (2013.01); *F16B 12/50* (2013.01); *F16B 12/52* (2013.01); *A47B 13/021* (2013.01); *F16B 2012/443* (2013.01); *F16B 2012/466* (2013.01); *F16B 2012/505* (2013.01)

(58) Field of Classification Search
CPC . A47C 4/02; A47C 4/021; F16B 12/42; F16B 12/44; F16B 12/46; F16B 12/48; F16B 12/50; F16B 12/52; F16B 2012/443; F16B 2012/466; F16B 2012/505
USPC ......................................... 297/440.14, 440.1
See application file for complete search history.

(56) References Cited

U.S. PATENT DOCUMENTS 2,915,350 A * 12/1959 Sinclair ................ A47B 13/021
108/156
3,765,541 A * 10/1973 Madey ................... A47B 47/00
211/182

(Continued)

FOREIGN PATENT DOCUMENTS

| DE | 9200715 U1 | 4/1992 |
| DE | 9416016 U1 | 1/1995 |
| DE | 202005003595 U1 | 6/2005 |

*Primary Examiner* — Mark R Wendell
(74) *Attorney, Agent, or Firm* — Themis Law

(57) ABSTRACT

A modular frame for seats or furnishing elements provided with a supporting surface includes a plurality of section bars that are adapted to be rigidly constrained to one another so as to define the frame of the supporting surface. The cross section of the section bars is at least partially hollow and substantially triangular and is provided with an opening configured to allow a conveniently shaped terminal part of fixing elements to be longitudinally inserted in the section bar in order to join at least two section bars.

11 Claims, 5 Drawing Sheets

(51) Int. Cl.
 *F16B 12/46* (2006.01)
 *A47B 13/02* (2006.01)
 *F16B 12/44* (2006.01)

(56) References Cited

U.S. PATENT DOCUMENTS

| | | | |
|---|---|---|---|
| 2003/0215375 A1* | 11/2003 | Peddicord | A47B 13/02 422/275 |
| 2009/0087255 A1* | 4/2009 | Jorna | F16B 7/0453 403/171 |
| 2012/0269571 A1* | 10/2012 | Haimoff | F16B 12/46 403/205 |
| 2013/0272777 A1* | 10/2013 | Hayter | E06B 3/9645 403/205 |
| 2017/0218995 A1* | 8/2017 | Lesage | F16B 12/50 |
| 2017/0367501 A1* | 12/2017 | Goppion | A47F 3/005 |

* cited by examiner

MODULAR FRAME FOR MAKING SEATS AND FURNISHING ELEMENTS IN GENERAL PROVIDED WITH A SUPPORTING SURFACE

The present patent concerns seats and furnishing elements with a frame or structure made up of section bars, and in particular it concerns a new modular frame for making seats and furnishing elements in general provided with a supporting surface. Furnishing elements such as coffee tables or seats in general are known which comprise a frame that in its turn is made up of section bars, for example in metal or plastic. Said section bars generally have a box-shaped cross section, for example typically rectangular or substantially elliptical, but also generically square or circular.

These frames are generally made up of several section bars rigidly fixed to one another, for example through fixing means such as screws, or simply welded to one another.

Furnishing elements such as seats are known that, in addition to the supporting structure that makes up the seat frame, comprises also legs or elements suited to rest on the ground, possibly a back and a seating surface, for example made of plastic and constrained to the seat frame, or a plane constituted by a mesh of tie elements constrained to the seat frame, or a surface constituted by staves fixed with screws or welded to the rest of the frame.

Furnishing elements are known that are used in the waiting rooms of public places such as airports, stations, hospitals, offices and so on.

Said furnishing elements comprise a plurality of seats generally constrained to one another and arranged in rows or according to various layouts in order to occupy the space of the waiting rooms in an organized manner.

Said seats can be of the normal type, each one with its own frame, constrained to one another through removable or non-removable coupling means, or can be part of a modular structure in turn comprising elements suited to rest on the ground and a plurality of seats, if necessary spaced by one or more supporting surfaces serving as coffee tables.

The subject of the present invention is a new type of modular frame made up of section bars for making seats and furnishing elements in general and provided with a supporting surface.

The main object of the present invention is to provide a frame that can be easily assembled in order to make up a variously configured structure with one or more seats and/or one more supporting surfaces serving as coffee tables.

An advantage of the present invention lies in that the modular frame can be partially assembled in order to make up only the seating surface or the supporting surface, having reduced overall size and a shape suitable for stacking, in such a way as to facilitate storage and transport operations.

Another advantage offered by the present invention lies in that the modular frame can then be completely assembled during installation, as it requires only the rapid fixing of the legs or elements suited to rest on the ground through common fixing means.

Another advantage offered by the present invention lies in that the modular frame can be assembled with the aid of common tools and does not require specific technical skills.

These and other direct and complementary objects are achieved by the new type of modular frame for making seats and furnishing elements in general provided with a supporting surface, in particular for furnishing waiting rooms or public places. The new modular frame comprises a plurality of section bars suited to be rigidly constrained to one another in such a way as to define the frame of one or more seats or one or more supporting surfaces in general, for example serving as tables in general, the cross section of each one of said section bars being at least partially hollow and substantially triangular, meaning that it comprises:
  a first side intended to face upwards,
  a second side intended to be arranged in a substantially vertical or inclined position so as to form the inner side of the frame of the seat or supporting surface,
  a third oblique side,
  a first opening in a preferably elongated shape, arranged so that it is parallel and close to said first side and suitable for the insertion of fixing elements between at least two section bars.

According to the invention, said cross section may comprise also a second opening, preferably elongated in shape and arranged so that it is orthogonal to said first side or parallel and close to said second side, suitable for the insertion of reinforcement bars, if necessary, in the case of very long section bars, for making seats or furnishing elements with special configurations.

The new modular frame furthermore comprises at least one fixing element between at least two section bars, said fixing element in turn substantially comprising a plate with at least two conveniently shaped terminal parts, for example substantially flat, suited to be inserted, with a precise fit or with a play, in said first openings provided at the ends of two section bars to be joined.

In order to obtain the angle of the frame of a seat or supporting surface in general, said section bars must be arranged in such a way that generically they are not aligned with one another, for example arranged so as to form a right angle or any angle. In this case, said fixing elements are angular, meaning that said flat terminal parts are arranged so as to form a right angle or any angle.

Said flat terminal parts and the ends of said section bars are generally provided with through holes in corresponding positions, so that it is possible to insert common constraining means, such as rivets or screws in general, therethrough.

Said angled or linear fixing element furthermore comprises, in a position generically included between said terminal parts, a plane portion provided with through holes for the insertion of constraining means suited to constrain said fixing element to at least one leg or element suited to rest on the ground.

Said leg or element suited to rest on the ground comprises an elongated body, in any length, which determines the height of the supporting surface defined by said frame, with one end suited to rest on the ground and a substantially flat and horizontal upper end shaped so that said plane portion of the fixing element can rest thereon and provided with corresponding through holes for the insertion of constraining means, such as rivets or screws, suited to constrain it to said plane portion of the fixing element.

According to the invention, the frame can furthermore comprise at least one plate suited to be positioned on top of said plane portion of the fixing element and provided with through holes in corresponding positions for the insertion of said constraining means, rivets or screws, of said leg or element suited to rest on the ground.

In an example of embodiment of a substantially rectangular or square seat, said frame thus comprises at least four of said section bars constrained to one another so as to define the frame of at least one seat or supporting surface in general, and elements suited to rest on the ground, preferably one for each angle of the frame, wherein said supporting surface is in its turn constituted by a plurality of tie elements, preferably arranged so that they cross one another.

Each one of said tie elements is preferably constrained and kept tensioned between two opposite section bars of the frame.

For this purpose, said cross section of each section bar furthermore comprises at least one projection that is integral with said second side and thus suited to face towards the inside of the frame of the seat or supporting surface, in turn comprising, for example, a shelf suited to be drilled in order to allow coupling means of said tie elements to be fixed.

In order to assemble the new frame, first of all only the supporting surface is assembled, which in its turn is constituted by said frame, obtained by constraining said section bars and corresponding fixing elements between the section bars, and by said crossed tie elements.

The supporting surface obtained in this way has a plane shape and its overall size is determined by the total surface, defined by the external edge of the frame, and by the total thickness defined by the thickness of the section bars.

The supporting surface thus has a regular shape and can be easily stacked on other identical supporting surfaces, making storage and transport operations simple and rapid.

In fact, there are no projecting elements that make the shape of the supporting surface irregular. In fact, even at the level of the fixing points of the elements suited to rest on the ground there are no projecting parts.

The characteristics of the new frame are highlighted in greater detail in the following description with reference to the attached drawings that are enclosed by way of non-limiting examples.

The invention is a new modular frame (A) comprising a plurality of section bars (1) suited to be rigidly constrained to one another so as to define the frame (A4) of one or more seats or of one or more supporting surfaces (A3) in general, for example serving as a coffee table.

Figure 1:
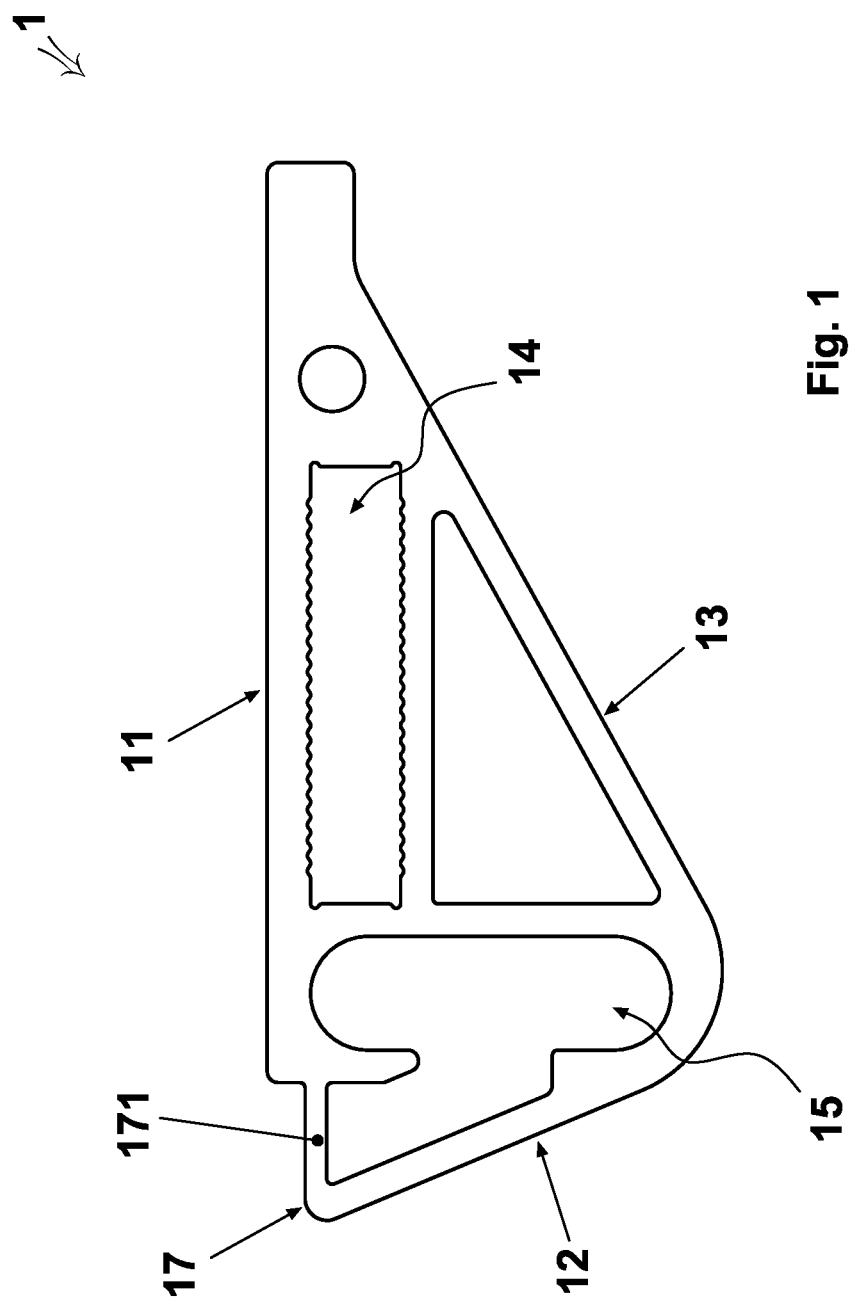
FIG. 1 shows a cross section of a section bar (1) in its preferred embodiment.

The preferred cross section of each one of said section bars (1), for example shown in FIG. 1, is at least partially hollow and substantially triangular, meaning that it comprises:
    a first side (11) intended to face upwards,
    a second side (12) intended to be arranged in a substantially vertical or inclined position so as to form the inner side of the frame (A4) of the seat or supporting surface (A3),
    a third oblique side (13).

The cross section comprises a first opening (14) in a preferably elongated shape, arranged so that it is parallel and close to said first side (11) and suited to allow a conveniently shaped terminal part (21) of fixing elements (2) between at least two section bars (1) to be inserted in said section bar (1) longitudinally.

Said cross section comprises also a second opening (15) in an elongated shape, arranged so that it is orthogonal to said first side (11) or parallel and close to said second side (12), suitable for the insertion of reinforcement bars, if necessary, in the case of very long section bars (1), for the purpose of obtaining seats or furnishing elements in special shapes.

The new modular frame (A) comprises at least one fixing element (2) between at least two section bars (1), said fixing element in turn substantially comprising a plate with at least two substantially flat terminal parts (21) suited to be inserted, with a precise fit or a play, in said first openings (14) at the opposite ends (16) of two section bars (1) to be joined.

In order to obtain an angle (A1) of the frame (A4) of a seat or supporting surface (A3) in general, said section bars (1) are arranged in such a way as to form a right angle. In this case, said fixing elements (2) are angular, meaning that said flat terminal parts (21) are arranged so as to form a right angle.

Said flat terminal parts (21) of said fixing elements (2) and the ends (16) of said section bars (1) are generally provided with through holes (22, 18) in corresponding positions so as to allow common constraining means, such as rivets or screws in general, to be inserted therethrough.

Said angled or linear fixing element (2) furthermore comprises, in a position generically included between said terminal parts (21), a plane portion (23) provided with through holes (24) for the insertion of means suited to constrain said fixing element (2) to said at least one leg or element suited to rest on the ground (3).

Said leg or element suited to rest on the ground (3) comprises an elongated body (31), with any length, determining the height of the supporting surface (A3) defined by said frame (A4), with an end (32) suited to rest on the ground and a substantially flat and horizontal upper end (33) configured, for example, with a seat (35) where said plane portion (23) of the angled fixing element (2) can rest.

Said flat upper end (33) is provided with holes (34), for example blind holes or internally threaded holes, corresponding to said holes (24) of the plane centre portion (23) of the fixing element (2), for the insertion of constraining means, such as rivets or screws in general, between said leg (3) and said fixing element (2).

According to the invention, the frame (A) may furthermore comprise at least one upper plate (4) suited to be positioned on top of said plane portion (23) of the fixing element (2) and provided with through holes (41) in positions corresponding to said holes (24, 34) of said fixing element (2) and of said flat upper end (33) of the leg (3) for the insertion of said constraining means, for example rivets or screws.

Figure 2:
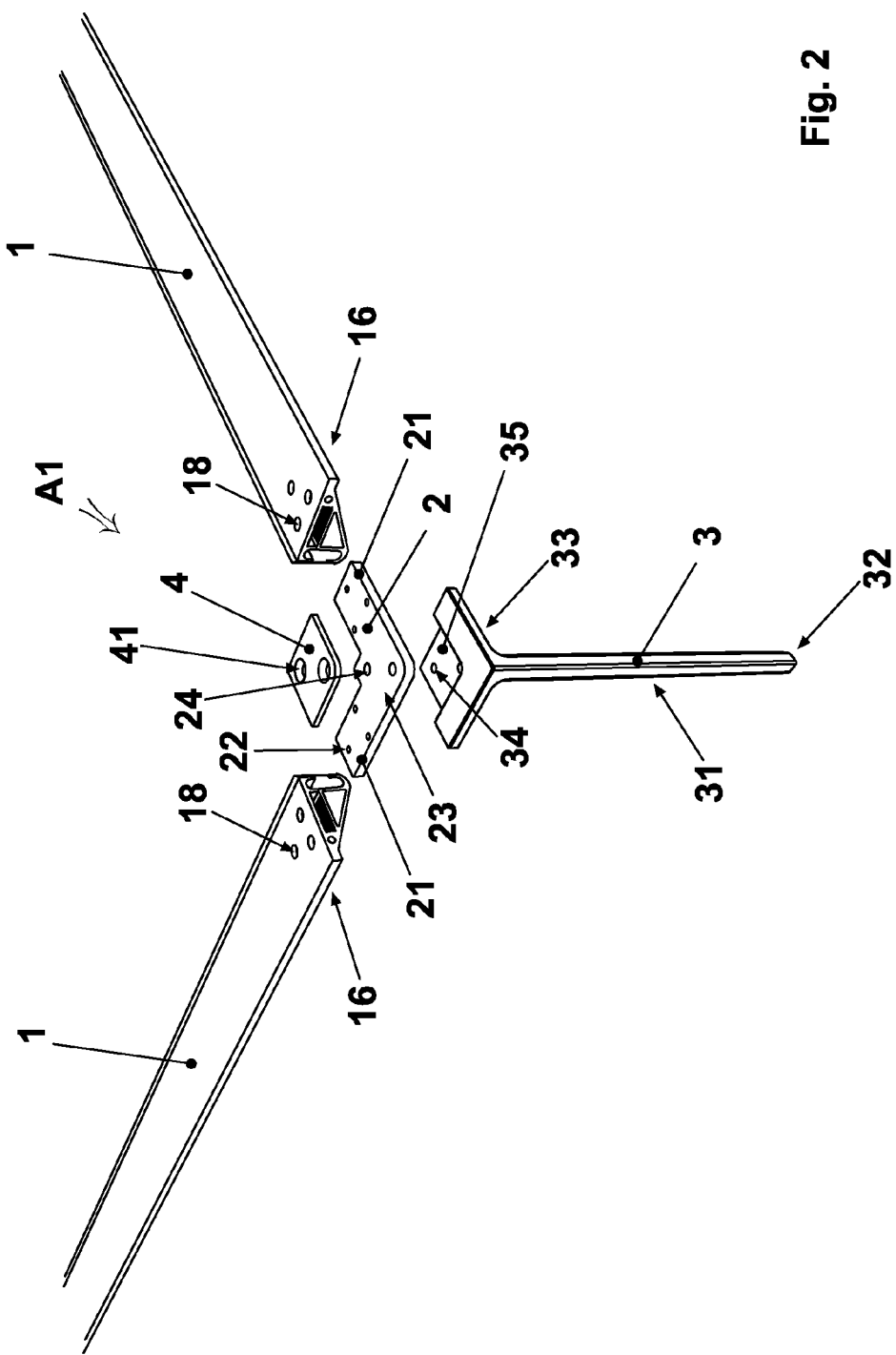
FIG. 2 shows an exploded view of an angle (A1) of the new frame (A) constituted by a pair of section bars (1) arranged orthogonally to each other, an angled fixing element (2), a leg or element suited to rest on the ground (3) and a fixing plate (4) suited to fix said element to be rested on the ground (3).
Figure 3:
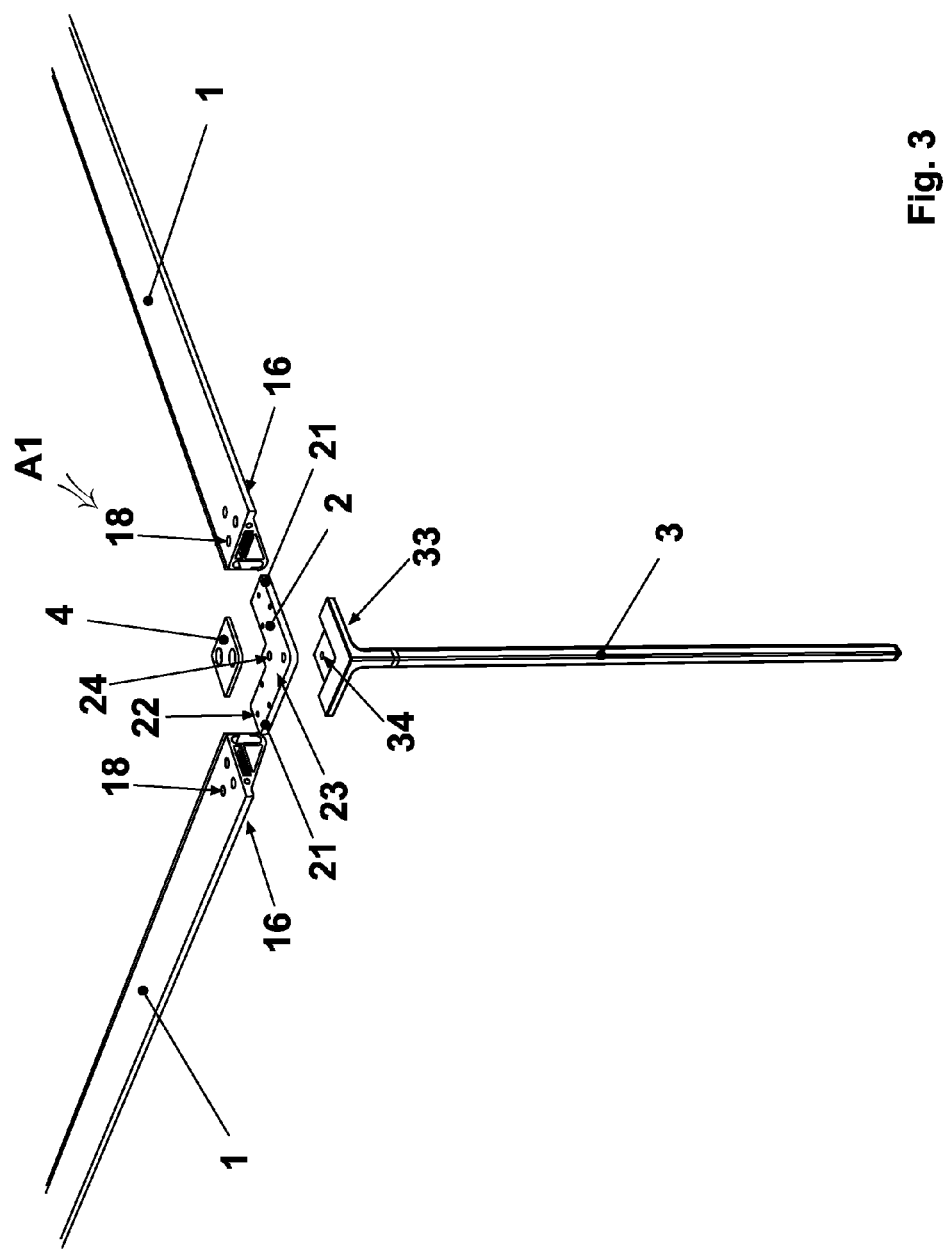
FIG. 3 shows an exploded view of an angle (A1) of the frame (A) with a leg or element suited to rest on the ground (3) having a different length.

FIGS. 2 and 3 show how it is possible to obtain furnishing elements having different heights, according to the length of said legs or elements suited to rest on the ground (3).

Figure 4:
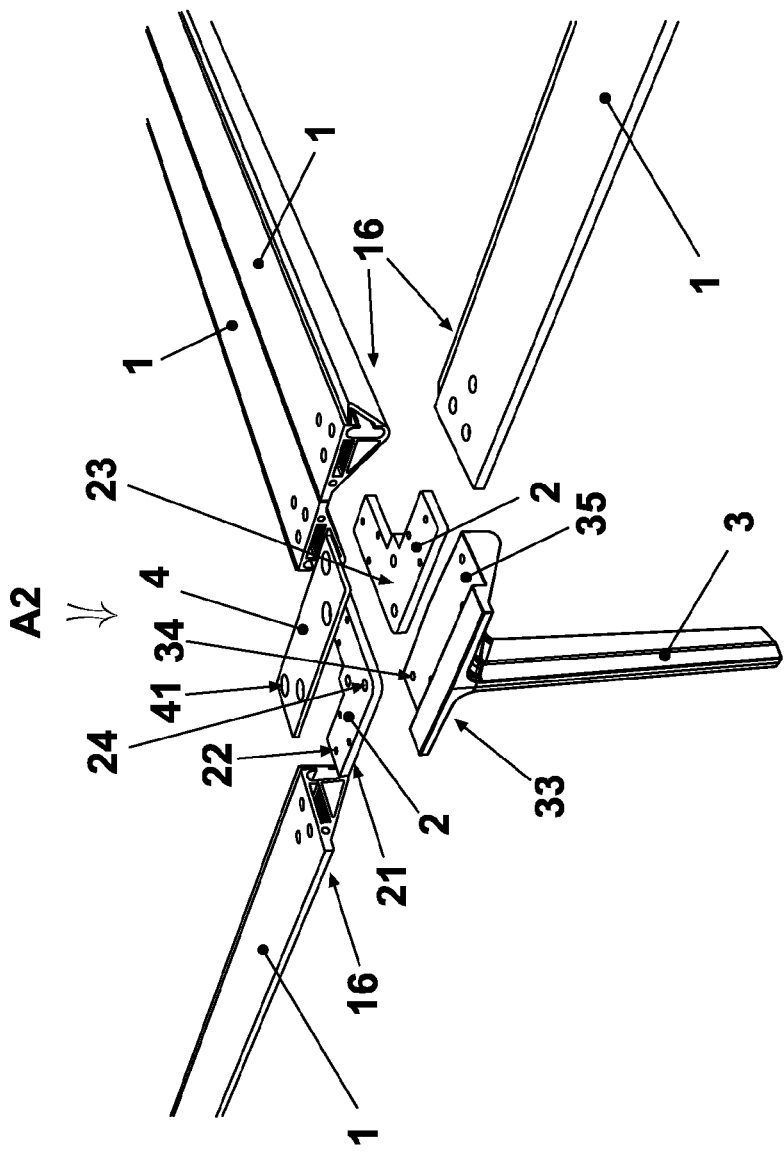
FIG. 4 shows an exploded view of the part (A2) connecting two angles, with two pairs of section bars (1), two angled fixing elements (2), a single leg or element suited to rest on the ground (3) and a fixing plate (4) suited to join said element to be rested on the ground (3) to said two angled fixing elements (2).

FIG. 4 shows a possible composition of the new frame in which two frames (A4) are joined at the level of two corresponding angles (A1). In this case, said leg (3) comprises said flat upper end (33) that is enlarged and has an enlarged seat (35) suited to allow two plane portions (23) of two angled fixing elements (2) arranged close and specular to each other to be rested thereon, each one of said fixing elements (2) being in its turn suited to constrain a pair of section bars (1) arranged orthogonal to each other.

Said flat upper end (33) of the leg (3) thus comprises two series of said holes (34) in positions corresponding to said holes (24) of both of said angled elements (2), in such a way as to allow both of the angled elements (2) to be fixed.

Analogously, also said upper plate (4) has an enlarged shape with two series of said through holes (41) corresponding to said holes (24, 34) of said angled elements (2) and of said upper end (33) of said leg.

Figure 5:
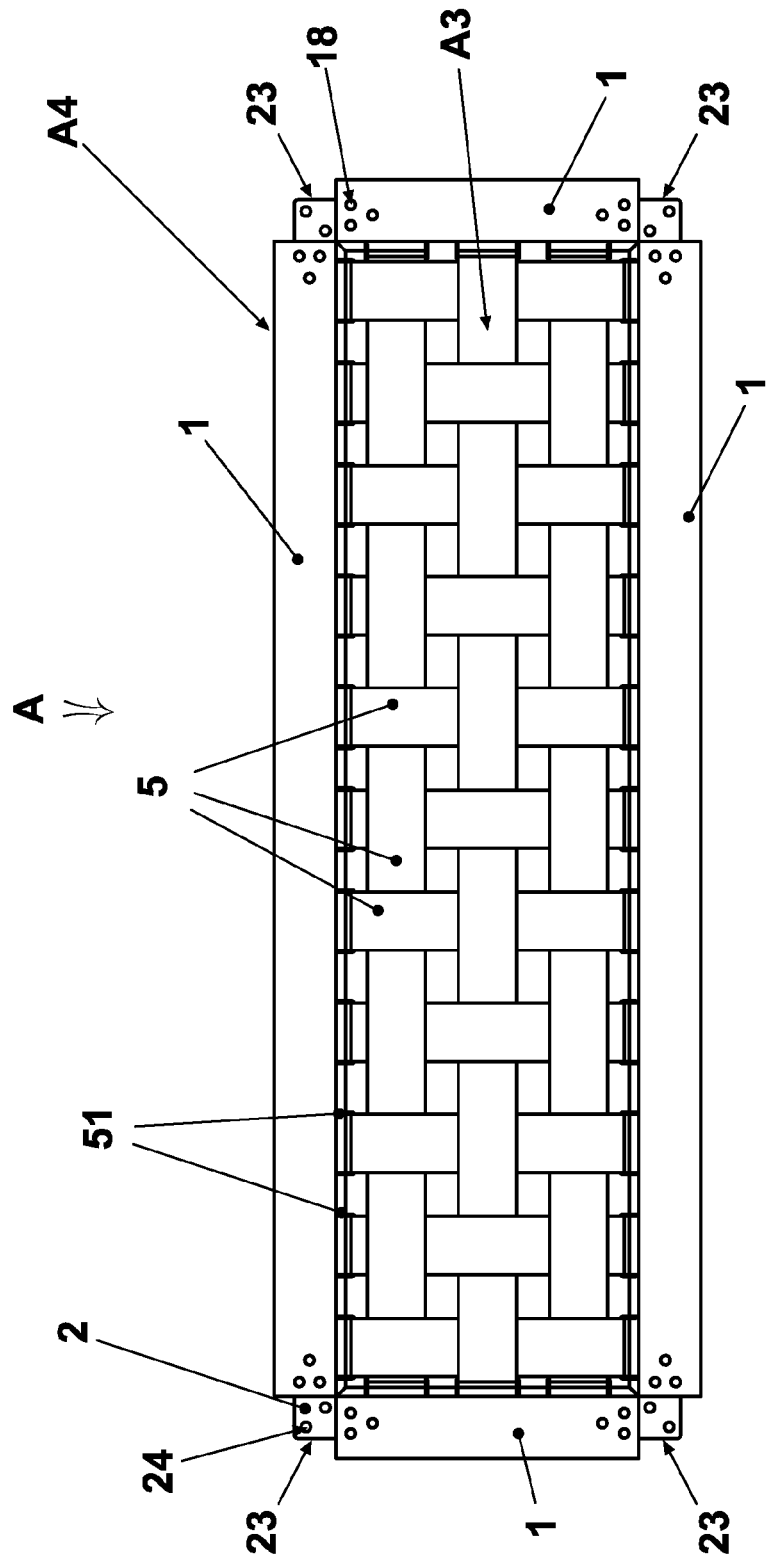
FIG. 5 shows a top view of a frame (A) partially assembled in such a way as to form a seat or supporting surface (A3) in general, in turn made up of section bars (1) so as to define a frame (A4), for example rectangular, of the supporting surface (A3), and crossed tie elements (5) constrained and tensioned between said section bars (1).

FIG. 5 shows an example of embodiment of a substantially rectangular seat or supporting surface (A3), comprising four of said section bars (1) constrained to one another in such a way as to define the frame (A4) of the supporting surface (A3). The supporting surface (A3) comprises also a plurality of tie elements (5), preferably arranged so that they cross each other.

Each one of said tie elements (5) is constrained and kept tensioned between two opposite section bars (1) of the frame (A4) of the supporting surface (A3).

For this purpose, as shown in FIG. 1, said cross section of each section bar (1) comprises at least one projection (17) integral with said second side (12) and thus suited to face towards the inside of the frame (A4) of the supporting surface (A3), in turn comprising, for example, a shelf (171) suited to be drilled so as to allow coupling means (51) of said tie elements (5) to be fixed.

According to the invention, said section bars (1) can be linear, straight, curved, angled with one or more angles having any size.

Therefore, with reference to the above description and the attached drawings, the following claims are expressed.

The invention claimed is:

1. A modular frame (A) for seats or furnishing elements provided with at least one supporting surface (A3), comprising:
   a plurality of section bars (1) rigidly constrained to one another so as to define the frame (A4) of said at least one supporting surface (A3); and
   one or more fixing elements (2) having a plane portion and a plurality of terminal parts each extending from the plane portion at different angles,
   wherein a cross section of one or more of said section bars (1) is at least partially hollow and substantially triangular and comprises:
   a horizontal first wall (11) facing upwards,
   a second wall (12) extending from said first wall and arranged in a substantially vertical or inclined position so as to form an inner side of the frame (A4) of the seat or supporting surface (A3), and
   a third oblique wall (13) connecting said first and second walls,
   wherein said cross section further comprises a first opening (14) configured to receive one of the terminal parts (21) when longitudinally inserted in one of said section bars (1) in order to join at least two of said section bars (1).

2. The modular frame (A) according to claim 1, wherein said first opening (14) has an elongated shape and is arranged parallel and adjacent to said first wall (11) of the cross section of a said section bar (1).

3. The modular frame (A) according to claim 1, wherein said cross section further comprises a second opening (15) defined in an interior of said cross section and having an elongated shape and arranged so that it is orthogonal to said first wall (11) or parallel and in proximity of said second wall (12), and is configured for a longitudinal insertion of a reinforcement bar into one or more of said section bars (1).

4. The modular frame (A) according to claim 1, wherein at least one fixing element (2) is disposed between at least two section bars (1), said plurality of terminal parts (21) being substantially flat and configured to be inserted, with a precise fit or with a play, in said first openings (14) at opposite ends (16) of the two section bars (1) to be joined, wherein said terminal parts (21) of said at least one fixing element (2) and the ends (16) of said section bars (1) are provided with through holes (22, 18) in corresponding positions for insertion of fasteners therethrough.

5. The modular frame (A) according to claim 4, wherein said one or more fixing elements (2) are angled, and wherein said terminal parts (21) are arranged to form an angle, in order to constrain the section bars (1) arranged to form an angle between one another.

6. The modular frame (A) according to claim 5, further comprising one or more legs or elements adapted to rest on a ground (3) and having a substantially flat and horizontal upper end (33) configured to support the plane portion (23) in a position included between said terminal parts (22), wherein said flat upper end (33) and said plane portion (23) are provided with corresponding holes (34, 24) for insertion of fasteners between said leg (3) and said fixing element (2).

7. The modular frame (A) according to claim 6, further comprising at least one upper plate (4) adapted to be positioned on top of said plane portion (23) of the fixing element (22) and provided with through holes (41) in positions corresponding to said holes (24, 34) of said fixing element (2) and of said flat upper end (33) of the leg (3), for insertion of constraining fasteners.

8. The modular frame (A) according to claim 7, wherein said upper flat end (33) of said leg (3) and said upper plate (4) have a larger shape than a remainder of said leg and comprise at least two series of said holes (34, 41) in positions corresponding to said holes (24) of two of said fixing elements positioned near each other and specular with respect to each other, so as to fix both of the angled elements (2), and wherein said upper flat end of said leg has a seat defined therein that is dimensioned to receive the plane portion.

9. The modular frame (A) according to claim 1, wherein said supporting surface (A3) further comprises a plurality of tie elements (5) constrained to said section bars (1) so that said tie elements are kept tensioned.

10. The modular frame (A) according to claim 9, wherein said cross section of each section bar (1) comprises at least one projection (17) formed in said second wall (12) and arranged to face towards an inside of the frame (A4) of the supporting surface (A3), said projection (17) comprising a shelf (171) adapted to be drilled so as to allow fasteners (51) of said tie elements (5), arranged in a cross pattern, to be fixed, and wherein each one of said tie elements is constrained and kept tensioned between two opposite section bars (1) of said frame (A4).

11. The modular frame (A) according to claim 1, wherein said section bars (1) are shaped as a straight line, a curve, or an angle.

* * * * *